(12) United States Patent
Chordia et al.

(10) Patent No.: US 8,460,550 B2
(45) Date of Patent: *Jun. 11, 2013

(54) CONTINUOUS PROCESSING AND SOLIDS HANDLING IN NEAR-CRITICAL AND SUPERCRITICAL FLUIDS

(75) Inventors: Lalit Chordia, Pittsburgh, PA (US); Jose Martinez, Gibsonia, PA (US); Andrew Kegler, Ripon, WI (US); Desai Bhishmakumar, Pittsburgh, PA (US)

(73) Assignee: Thar Process, Inc., Pittsburgh, PA (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/787,089

(22) Filed: May 25, 2010

(65) Prior Publication Data

US 2010/0267976 A1    Oct. 21, 2010

Related U.S. Application Data

(63) Continuation-in-part of application No. 11/103,673, filed on Apr. 12, 2005, now Pat. No. 7,722,771.

(60) Provisional application No. 60/561,305, filed on Apr. 12, 2004.

(51) Int. Cl.
*B01D 11/00* (2006.01)

(52) U.S. Cl.
USPC ........ 210/634; 196/14.52; 210/194; 210/175; 210/511; 210/774; 210/788; 210/805; 210/639

(58) Field of Classification Search
USPC .......................................... 210/175, 774, 788
See application file for complete search history.

(56) References Cited

U.S. PATENT DOCUMENTS

| 2,338,606 | A |   | 6/1944  | Voorhees |
|-----------|---|---|---------|----------|
| 4,094,651 | A |   | 6/1978  | Donath |
| 4,218,222 | A |   | 8/1980  | Nolan, Jr. et al. |
| 4,271,754 | A |   | 6/1981  | Homann |
| 4,357,865 | A |   | 11/1982 | Knuth et al. |
| 4,364,745 | A | * | 12/1982 | Weil ................... 48/209 |
| 4,415,336 | A |   | 11/1983 | Stasi et al. |
| 4,467,713 | A |   | 8/1984  | Knuth et al. |
| 4,675,133 | A |   | 6/1987  | Eggers et al. |
| 4,783,010 | A |   | 11/1988 | Kissel |
| 4,901,635 | A | * | 2/1990  | Williams ................ 99/483 |
| 4,962,275 | A | * | 10/1990 | Bruno .................. 585/834 |
| 5,041,245 | A |   | 8/1991  | Benado |
| 5,290,959 | A | * | 3/1994  | Rice ................... 554/11 |
| 5,411,715 | A |   | 5/1995  | Czekai et al. |
| 5,630,911 | A |   | 5/1997  | Kratochwill |
| 6,013,304 | A |   | 1/2000  | Todd |
| 6,248,910 | B1| * | 6/2001  | Franke ................ 554/12 |

(Continued)

FOREIGN PATENT DOCUMENTS

DE    4216295 A1    11/1993
EP    0156374 A2    10/1985

(Continued)

*Primary Examiner* — Joseph Drodge
(74) *Attorney, Agent, or Firm* — David G. Oberdick; Peter J. Borghetti (57) ABSTRACT

Apparatus for the continuous processing and solids handling in first near-critical and supercritical fluids. The present invention also allows for treatment of the starting material with the first near-critical or supercritical fluid. The remaining raffinate is then continuously transferred and may be collected in a second fluid.

45 Claims, 8 Drawing Sheets

U.S. PATENT DOCUMENTS

| | | |
|---|---|---|
| 6,249,752 B1 * | 6/2001 | Cunningham et al. ........ 702/100 |
| 6,262,285 B1 | 7/2001 | McDonald |
| 6,279,250 B1 | 8/2001 | Anderson |
| 6,509,051 B1 | 1/2003 | Wills |
| 7,722,771 B2 * | 5/2010 | Chordia et al. ............... 210/634 |
| 2002/0134704 A1 | 9/2002 | Mitchell et al. |
| 2003/0072867 A1 | 4/2003 | Anderson |
| 2004/0225148 A1 | 11/2004 | Isogai et al. |

FOREIGN PATENT DOCUMENTS

| | | |
|---|---|---|
| EP | 0338940 A2 | 10/1989 |
| EP | 1000984 A1 | 5/2000 |
| EP | 1004245 A2 | 5/2000 |
| FR | 637386 | 4/1928 |
| GB | 166993 | 7/1921 |
| GB | 418107 | 10/1934 |

* cited by examiner

CONTINUOUS PROCESSING AND SOLIDS HANDLING IN NEAR-CRITICAL AND SUPERCRITICAL FLUIDS

CROSS-REFERENCE TO RELATED APPLICATION

This patent application is a Continuation In Part Application of U.S. non-provisional application Ser. No. 11/103,673 now U.S. Pat. No. 7,722,771, titled CONTINUOUS PROCESSING AND SOLIDS HANDLING IN NEAR-CRITICAL AND SUPERCRITICAL FLUIDS, filed on Apr. 12, 2005, which claims benefit of U.S. provisional application Ser. No. 60/561,305, titled CONTINUOUS PROCESSING AND SOLIDS HANDLING IN NEAR-CRITICAL AND SUPERCRITICAL FLUIDS, filed on Apr. 12, 2004, and claims benefit of PCT international application no. PCT/US2005/012260, titled CONTINUOUS PROCESSING AND SOLIDS HANDLING IN NEAR-CRITICAL AND SUPERCRITICAL FLUIDS, filed on Apr. 12, 2005, which claims benefit of U.S. provisional application Ser. No. 60/561,305, all are incorporated herein by reference.

FIELD OF THE INVENTION

The present invention is related generally to the field of solid handling, and in particular to continuous extraction process using near-critical and supercritical fluids.

BACKGROUND

The processing of solids using supercritical fluids is typically carried out by either batch or semi-continuous methods. In a production environment, these methods require an increased number of vessels, as well as large volumes. Additionally, batch processes are more time consuming and carry a higher risk of product contamination. There is also an increase in equipment fatigue due to pressurization and depressurization steps and supercritical fluid losses during the process. Because of these factors, supercritical fluid processing has been directed toward specialty products instead of commodity products. These disadvantages, however, may be overcome by the development of a continuous process for near-critical or supercritical fluids.

Supercritical fluids have gained wide acceptance in the past decade for their use in a number of processes. They are unique in the sense that density can be manipulated by simply changing pressure or temperature. Thus, all density-dependent properties are also varied. This makes supercritical fluids ideal candidates for extraction solvents. At a given set of conditions, a substance can be dissolved and extracted in the supercritical fluid. Once extracted, the extracted product can be separated from the supercritical fluid simply by modifying the thermodynamic properties of the fluid (changing temperature and/or pressure) or by a separating device such as an absorption column or an adsorption vessel. No further separation steps are necessary. Carbon dioxide is a popular supercritical fluid because it is nontoxic, inexpensive, and widely available. Another popular fluid that can be used is propane. Propane is also relatively inexpensive and can be used at low pressures.

A wide variety of solids can be processed using supercritical fluids such as various vegetable seeds, food ingredients, herbs, botanicals, solids contaminated with toxic organic material or pharmaceutical materials. By performing the extraction with a supercritical fluid, as opposed to an organic solvent, such as hexane, residual solvent levels are negligible and meet regulatory standards for both the food and pharmaceutical industries. Therefore, by developing a continuous process for solids that utilizes supercritical fluid technology, many advantages can be realized.

Some continuous processes for solids have been developed in the past, including U.S. Pat. No. 4,675,133 and U.S. Pat. No. 5,041,245. While these patents disclose continuous processes for the extraction of vegetable oil, a screw press was used in both instances to transfer the material into the vessel. While screw feeders are widely known in the art, they do possess certain limitations. In particular, a screw press typically imparts force upon the material and compacts it while moving it from one place to another. Extracting from a highly-compacted material can reduce yield and quality because the reduced surface area does not allow for intimate contact between the starting material and the extracting fluid. Additionally, a screw press has pressure limitations and requires a significant amount of energy input.

BRIEF SUMMARY OF THE INVENTION

One embodiment of the present invention comprises a method for introducing a solid starting material into a vessel containing a near-critical or supercritical fluid. The steps of this method embodiment comprise: (i) providing a loading zone; (ii) providing a restriction device between the loading zone and the vessel; (iii) loading the loading zone with the starting material; (iv) closing the loading zone to the environment; (v) equalizing the pressure in the loading zone with the vessel pressure; and (vi) transferring the starting material from the loading zone to the vessel through a mechanical conveying device.

Another embodiment of the present invention comprises a method for removing raffinate from a vessel containing a near-critical or supercritical fluid into an unloading zone. This method comprises: (i) providing a vessel with a raffinate; (ii) providing an unloading zone; (iii) providing a barrier fluid in the unloading zone to collect the raffinate; and (iv) removing the barrier fluid and the raffinate.

An additional embodiment of the present invention encompasses a method for the continuous processing of a starting material using a near-critical or supercritical fluid. Such method comprises: (i) loading a loading zone with the starting material; (ii) providing a vessel for treatment of the starting material; (iii) equalizing the pressure in the loading zone with the vessel pressure using the near-critical or supercritical fluid; (iv) introducing the starting material from the loading zone into the vessel under near-critical or supercritical conditions through a restriction device through a mechanical conveying device or gravity; (v) treating the starting material with the near-critical or supercritical fluid; and (vi) collecting raffinate in an unloading zone. Typically, the pressure in the unloading zone and the vessel are the same. In the case that a barrier fluid is used, the barrier fluid is pumped up to the vessel pressure. In case that a barrier fluid is not used an equalization circuit between the vessel and unloading zone is required, which is similar to the one use between the loading zone and vessel.

Another embodiment of the present invention comprises an apparatus for introducing a starting material into a vessel containing a near-critical or supercritical fluid. This apparatus comprises: (i) a loading zone; (ii) a restriction device between the loading zone and the vessel for equalizing the pressure between the loading zone and the vessel; (iii) a mechanical conveying device for transferring the starting material from the loading zone to the vessel or no mechanical conveying device where gravity is the sole conveying mechanism; and (iv) a restriction device between the loading zone and the vessel through which the starting material enters the vessel.

Another embodiment of the present invention comprises an apparatus for removing raffinate from a vessel containing a near-critical or supercritical fluid into an unloading zone containing a barrier fluid in the unloading zone to collect the raffinate.

Another embodiment of the present invention comprises an apparatus for the continuous processing of a starting material using a near-critical or supercritical fluid. This apparatus comprises: (i) a loading zone; (ii) a mechanical conveying device for introducing the starting material from the loading zone into a vessel for treating the starting material under near-critical or supercritical conditions; (iii) a restriction device through which the starting material enters the vessel; (iv) a pressure equalization device between the loading zone and the vessel; and (v) an unloading zone for collecting the raffinate. As mentioned above, the pressure in the unloading zone and the vessel are typically the same. In the case that a barrier fluid is used, the barrier fluid is pumped up to the vessel pressure. In the case that a barrier fluid is not used an equalization circuit between the vessel and unloading zone is required, which similar to the equalization port used between the loading zone and vessel.

BRIEF DESCRIPTION OF THE DRAWINGS

For the present invention to be easily understood and readily practiced, the invention will now be described, for the purposes of illustration and not limitation, in conjunction with the following figures, wherein.

DETAILED DESCRIPTION

One embodiment of the present invention provides a method and apparatus for continuous processing and solids handling in near-critical and supercritical fluids. A starting material is transferred into a loading zone. The starting material is fed from a storage area, through a restriction device to load the loading zone. This can be accomplished by any suitable propelling device, including but not limited to gravity, a conveyor or the addition of a fluid. These examples are meant to illustrate some suitable propelling device, but are not intended to limit the scope of this invention. It will be obvious to one skilled in the art that a multitude of suitable propelling device and conveyors exist and all are encompassed by the scope of the present invention. In one embodiment of the present invention, the conveyor is a belt driver. In another embodiment of the present invention, the fluid may be the near-critical or supercritical fluid present in the vessel or a different fluid.

Once the loading zone is loaded, the starting material is transferred to a vessel through a restriction device. As stated above, this can be accomplished by any suitable propelling device, including but not limited to gravity or a mechanical conveying device. This process may be performed in a continuous or semi-continuous manner. In order to make the transfer of the starting material into the vessel more facile, the pressure in the loading zone may be equalized to the pressure of the vessel. Pressure equalization is accomplished by directing the near-critical or supercritical fluid in the vessel into the loading zone through a restriction device. Possible restriction device include but are not limited to a ball valve, check valve, gate valve, rotary valve, plug valve, a sealing mechanism, or any other device that satisfies the criteria for the restriction device and the mechanical conveying device may be a hydraulic or pneumatic piston or any other device that satisfies the criteria for the mechanical conveying device.

Using a hydraulic- or pneumatic-driven piston to load the starting material into the vessel provides several advantages. When a screw press is used, the material typically gets compacted, thus diminishing the amount of near-critical or supercritical fluid that can percolate into and through the material and extract any soluble substances. However, by using a hydraulic- or pneumatic-driven piston, the starting material gets less compacted, allowing for the near-critical or supercritical fluid to percolate into and through the starting material and extract the soluble substances more easily. A hydraulic- or pneumatic-driven piston can be used for a wide variety of starting materials. Because some starting materials do not have the characteristics required, such as flowability or heaviness, to be transferred to the vessel by gravity, a mechanical conveying device has to be employed.

In another embodiment of the present invention, a separate conveying device can be used within the vessel to control the transfer rate of the starting material through the vessel and thus, to control the contact time between the starting material and the near-critical or supercritical fluid. The separate conveying device within the vessel is controlled and may be driven from inside or outside of the vessel. The separate conveying device may be any device that serves the stated purpose. Some examples of possible separate conveying device, for the purpose of illustration and not limitation, include pneumatic, hydraulic, electric, magnetic, or a combination thereof.

The near-critical or supercritical fluid to be used in some embodiments of the present invention process includes, but is not limited to, ethane, propane, carbon dioxide, nitrous oxide, butane, isobutene, sulfur hexafluoride, water, hydrochlorofluorocarbons, hydrofluorocarbons, alkanes, or a combination thereof. However, the preferred near-critical or supercritical fluid is carbon dioxide or propane. In the vessel, the near-critical or supercritical fluid treats the starting material. The treatment is selected from the group consisting of extraction, reaction, coating, absorption, adsorption, or a combination thereof. In the preferred embodiments of the present invention, the temperature of the near-critical or supercritical fluid treatment is performed between 0° C. and 400° C. and pressure is between 10 bar and 1500 bar. In another embodiment of the present invention, more than one temperature zone is provided within the vessel.

In one embodiment of the present invention apparatus and method once the near-critical or supercritical fluid treats the starting material, the raffinate continuously enters an unloading zone, which is located at the bottom of the vessel or as a separate unit connected to the vessel, through a restriction device. For the purposes of this invention, the term raffinate refers to any of the material that is left in the vessel after treatment. In another embodiment of the present invention, there is no restriction device between the vessel and the unloading zone. In one embodiment of the present invention, the unloading zone contains a barrier fluid. The presence of the barrier fluid allows for the raffinate to be separated from the near-critical or supercritical fluid due to the low solubility of the near-critical or supercritical fluid in the liquid. Therefore, the barrier fluid is chosen such that it and the near or supercritical fluid are not substantially miscible with each other. However, the degree of miscibility is not a restriction in the way the invention is practiced. In some embodiments of the present invention, the barrier fluid may be selected from a group including water, alcohols, ethers, ketones, ionic liquids, any other fluid immiscible with the near-critical or supercritical fluid, or a combination thereof. It will be obvious to one skilled in the art that other barrier fluids may be used and the use of such other fluids is encompassed by the present invention. The raffinate is continuously removed from the vessel and collected. In some embodiments of the present invention, the barrier fluid is then recycled back to the vessel using a recirculation pump, which controls the barrier fluid level and keeps it constant. In other embodiments, the barrier fluid is not recirculated back to the extraction vessel, but fresh barrier fluid can be added to the unloading zone maintaining the barrier fluid level. The raffinate is then removed from the barrier fluid using a hydro-cyclone or other separation device available in the art.

In another embodiment of the present invention apparatus and method, the barrier fluid can be used to further treat substances in the raffinate that are soluble in the barrier fluid. In these embodiments of the present invention, the barrier fluid extraction is performed between 0° C. and 400° C. and the pressure is equal to the pressure in the vessel. This enables the extraction of non-polar or low polarity components using the near-critical or supercritical fluid and polar components using the barrier fluid, or the reverse in which polar components can be extracted in the near-critical or supercritical fluid and non-polar or low polarity components can be extracted in the barrier fluid. In another embodiment, there are multiple heating zones in the vessel, providing the flexibility of treating the starting material at constant temperature or at different temperatures. Such capability may facilitate fractionation of the starting material.

In another embodiment of the present invention apparatus and method, once the near-critical or supercritical fluid treats the starting material, the raffinate is collected in the unloading zone and continuously or semi-continuously removed from it using a separate mechanical conveying system such as screw press. This embodiment would not expose the raffinate to any barrier fluid. In another embodiment, a conveyor or screw system may be coupled with collection in a barrier fluid. Once the raffinate is collected in the barrier fluid, a conveyor or screw can be used to move the raffinate to a separation collection device, such as a hydro-cyclone. The barrier fluid is recycled back to the unloading zone.

The near-critical or supercritical fluid containing any soluble substances leaves the vessel from the top. The soluble substances are then separated from the near-critical or supercritical fluid by modifying the pressure and/or temperature or by using external agents such as adsorption vessels or absorption columns. The soluble substances are then collected using a cyclone separator or other collection or separation device known in the art. The near-critical or supercritical fluid is recycled back to the vessel at subcritical or supercritical conditions.

In another embodiment of the present invention apparatus and method, the near-critical or supercritical fluid containing any soluble substances can be fractionated by several methods, including, but not limited to, a temperature gradient, sequential depressurization, adsorption or absorption device, or a combination thereof.

In another embodiment of the present invention, the near-critical or supercritical fluid containing any soluble substances can be transferred to another column or vessel and undergo another treatment, such as a reaction. The reaction may be with another reactant or within the components present in the near-critical or supercritical fluid. The reaction may be of chemical, physical, biological, nuclear or enzymatic, or a combination thereof.

In one embodiment of the present invention, the loading zone, vessel, and unloading zone are contained in one unit. Therefore, the transfer of the starting material from the loading zone to the vessel, treatment of the starting material in the vessel, and collection and/or removal of the raffinate can all be carried out in a single unit.

In another embodiment of the present invention, the loading zone, vessel, and unloading zone are contained in separate units. The loading zone is in contact with the vessel through a restriction device, and the vessel is in contact with the unloading zone through a restriction device. There is no limitation to the axial orientation of any of the zones in the present invention.

Figure 1:
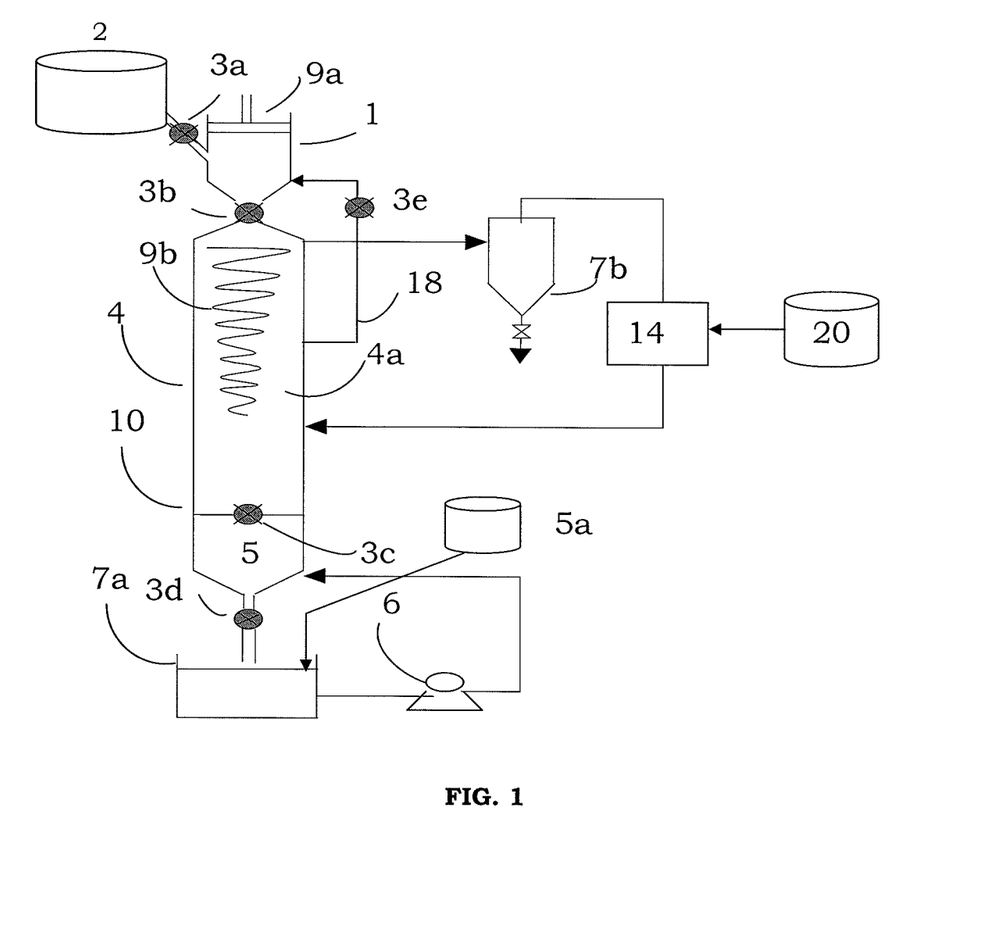
FIG. 1 is a schematic representation of one embodiment of the present invention for continuous processing and solids handling using a near-critical or supercritical fluid with a barrier fluid in the unloading zone.

FIG. 1 illustrates one embodiment of the present invention for the continuous processing of solids using near-critical or supercritical fluids. A starting material is transferred to the loading zone 1 from a storage tank 2 through a restriction device 3a. Once the loading zone 1 is loaded, the starting material is transferred into the vessel 4 through a restriction device 3b. Different restriction mechanisms, such as a check valve, ball valve, rotary valve or seal, may be used, but there is no limitation on the restriction device. The restriction device may be driven from inside or outside of the loading zone 1. A mechanical conveying device 9a such as a piston is used to transfer or facilitate the transfer of the starting material into the vessel 4. An additional device of facilitating the transfer of the starting material to the vessel 4 is to equalize the pressure in the loading zone 1 through a restriction device 3e with the near-critical or supercritical fluid itself or another fluid to the pressure in the vessel 4.

A mechanical conveying device 9b can be optionally located inside the vessel 4 is used to control the transfer rate of the starting material through the vessel 4. The mechanical conveying device 9b may extend the entire length of the vessel 4 or may be used in only certain sections, such as from between the restriction device 3b to a barrier fluid 5 in the unloading zone 10. In one embodiment, the mechanical conveying device 9b can be of pneumatic, electric, magnetic or hydraulic type and may be driven from inside or outside of the vessel 4. In another embodiment, a screw press may be used to accomplish the same effect. In another embodiment only gravity is relied on the convey the starting material through the treatment zone of vessel 4. Once the starting material is treated with the near-critical or supercritical fluid, the raffinate moves through a restriction device 3c into the barrier fluid 5 at the bottom of the unloading zone 10. The raffinate, which is continuously removed from the unloading zone 10 through a restriction device 3d, is then separated from the barrier fluid 5 using a separating device 7a. In one embodiment of the present invention, a hydrocyclone is used as the separating device 7a. However, various separation device known in the art can also be used. The barrier fluid 5 is recycled back to the unloading zone 10 using a recirculation device 6. The near-critical or supercritical fluid containing one or more soluble substances leaves the vessel 4 and the soluble substances are separated from the near-critical or supercritical fluid using a separating device 7b. Separation of the soluble substances from the near-critical or supercritical fluid can be accomplished by various methods. Manipulation of thermodynamic properties such as temperature and pressure, addition of external agents, membrane separation, adsorption, absorption and other techniques known in the art may be used for this purpose. The soluble substances can be recovered in the separating device 7b and the near-critical or supercritical fluid can be recycled back to the vessel 4.

The immiscibility of the near critical/super critical fluid with the barrier fluid 5 allows the raffinate to gravitationally migrate from the near critical/super critical fluid to the barrier fluid. In order to carry out a continuous extraction in vessel 4, fresh starting material must to be added and exhaust material (after removal of extractable compounds) must be removed. To remove that solid material from the vessel, a restriction device 3c, such as valve or any other mechanical device, can be used to allow transferring the solids from the extraction vessel or treatment zone 4a to the unloading zone 10. The barrier fluid 5 could be used in the unloading zone 10 between restriction device 3c and 3d. However, the barrier fluid 5 could also be used directly in the extraction vessel or treatment zone 4a. This allows incorporating the unloading zone 10 in the extraction vessel 4a by removing the restriction means 3c (FIG. 4) and using the restriction means 3d to remove the material from the extraction vessel. The barrier fluid 5 is a liquid carrying out negligible amount of near-critical/supercritical fluid and because is non compressible fluid; a pressure drop takes place almost immediately after exit the restriction device 3d. Therefore the separation device 7A to separate the raffinate from the barrier fluid takes place at atmospheric pressure.

The barrier fluid 5 and raffinate leave the unloading zone 10 through a restriction device 3d. At that point this stream is depressurized at ambient pressure. The barrier fluid 5 is separated from the raffinate and pumped back to the unloading zone 10 at constant pressure. The recovery will be lower than 100% because some barrier fluid 5 will be carried out with the raffinate. Therefore additional amount of barrier fluid will be added to separation device 7a to compensate any losses of barrier fluid 5 that may occur.

Another embodiment of the present invention includes a cosolvent such as methanol or ethanol being added to the near-critical/supercritical fluid in order to increase the solubility of the material to be extracted in the near-critical/supercritical fluid. It is also preferable that the cosolvent be as immiscible in the barrier fluid as possible.

As discussed above, the barrier fluid 5 allows the raffinate to be separated from the near-critical/super critical fluid because the solubility of the near-critical/supercritical fluid in the barrier fluid 5 is negligible, while the raffinate, which is solid, will be immersed in the barrier fluid 5. The level of the barrier liquid 5 is maintained constant in the unloading vessel 5 acting as a physical barrier between the near-critical/supercritical fluid and the raffinate. An additional advantage is that the use of the barrier fluid reduces the losses of the near-critical/supercritical fluid, discuss further below.

Figure 7:
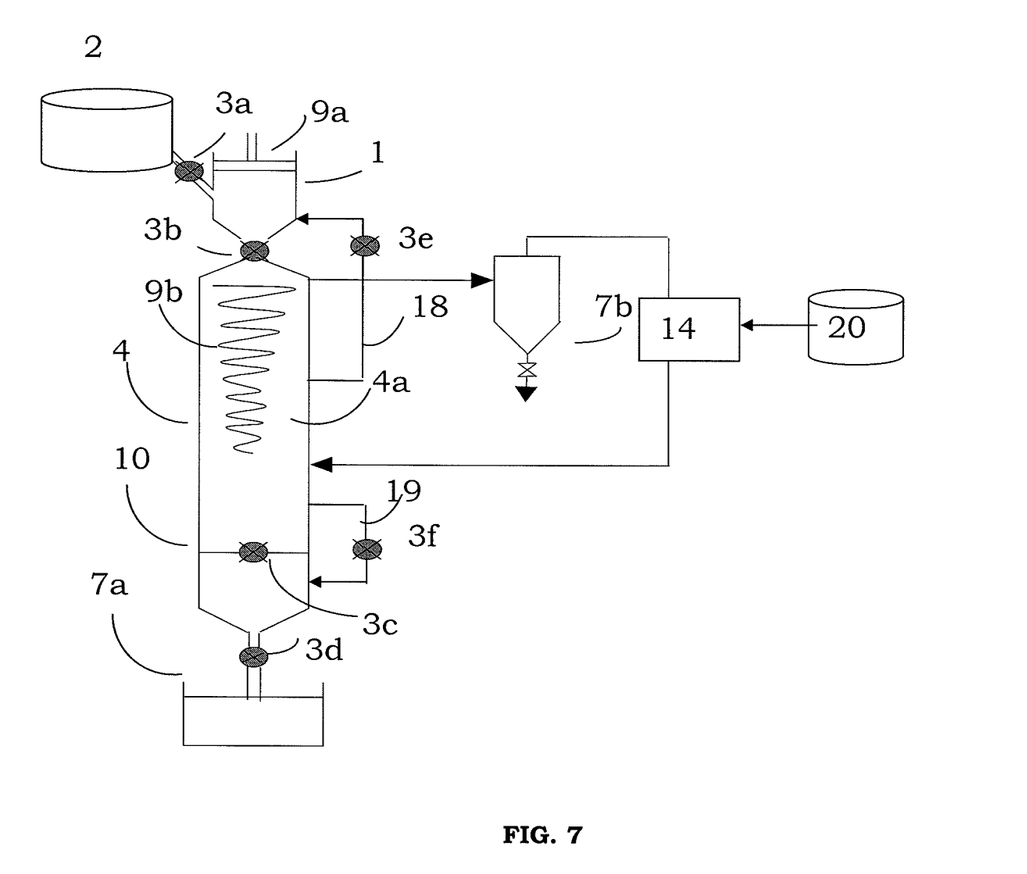
FIG. 7 is a schematic representation of another embodiment of the present invention for continuous processing and solids handling using a near-critical or supercritical fluid without a barrier fluid in the unloading zone.

Now turning to FIG. 7 illustrating another embodiment of the invention, the unloading zone 10 does not include barrier fluid 5. An additional restriction device 3f in fluid circuit 19 fluidly connecting vessel 4 and unloading zone 10 can be used to facilitate the transfer of the raffinate to the unloading zone 10 by equalizing the pressure in the unloading zone 10 to the pressure in vessel 4. The near critical or supercritical fluid or another fluid in the higher pressure vessel 4 can flow from vessel 4 to lower pressure unloading zone 10 through fluid circuit 19 and restriction device 3f before restriction device 3c is opened, which is similar to the restriction device 3e in flow circuit 18 used between the loading zone 1 and vessel 4. With the chamber pressures equalized, the raffinate (or solids) and a portion of the near critical/super critical fluid leaves the treatment zone in vessel 4 through a restriction device 3C to enter the unloading zone 10. Though barrier fluid 5 in the unloading zone 10 (FIG. 1) is beneficial in reducing the lose of the near critical/super critical fluid because the solubility of the near-critical/supercritical fluid is negligible thereby effectively holding back the near critical/super critical fluid from entering the unloading zone in large quantities and the material that leaves the extraction vessel is the solids (raffinate), the system without barrier fluid 5 is still sufficient to remove raffinate from the vessel 4.

One embodiment of the mechanical conveying device 9b can be a screw press can be used to remove the raffinate from the vessel 4 with or without the use of a barrier fluid 5.

Figure 2:
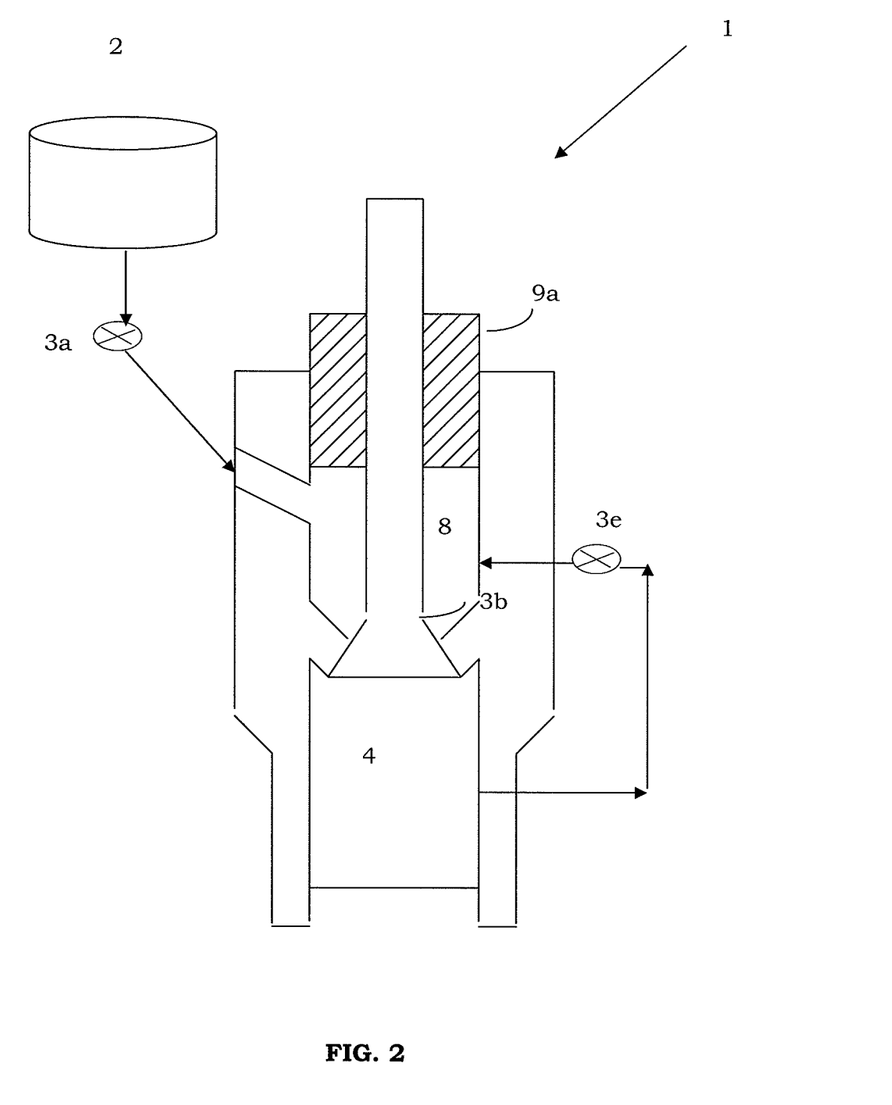
FIG. 2 is a schematic representation of the loading zone used to transfer the starting material into the vessel.

FIG. 2 illustrates one embodiment of the loading zone 1 of the present invention. A starting material is transferred into the loading zone 1 from a storage tank 2 through a restriction device 3a. The starting material enters an enclosed space 8 in the loading zone 1 beneath a mechanical conveying device 9a. A restriction device 3b is in a position such that the enclosed space 8 is closed off from the vessel 4. The mechanical conveying device 9a is then moved to a position to close off the enclosed space 8 from the point of entry of the starting material into the loading zone 1. In general, vessel 4 is always pressurized. Vessel 4 is vented out of space 8 in loading zone 1. Once the starting material is transferred to vessel 4, the restriction device 3b is positioned such that space (8) is closed. Then the loading zone 1 could be vented to the atmosphere. Fluid circuit 18 between vessel 4 having treatment zone 4a and loading zone 1 flows the first near-critical or supercritical fluid (liquid, vapor, or liquid-vapor) is treatment zone 4a having a higher pressure than loading zone 1 to equalize the pressure between loading zone 1 and vessel 4. A restriction device 3e in fluid circuit 18 is opened to allow entry of the near-critical or supercritical fluid in the vessel 4 into the enclosed space 8, which results in pressure equalization between the vessel 4 and the enclosed space 8 of loading zone 1. Once the pressure is equalized, the restriction device 3b is adjusted to allow entry of the starting material into the vessel 4. The mechanical conveying device 9a is then lowered to facilitate transfer of the starting material into the vessel 4 and to return the near-critical or supercritical fluid to the vessel 4. Any residual near-critical or supercritical fluid that is left in the enclosed space 8 can be vented to the atmosphere.

Figure 3:
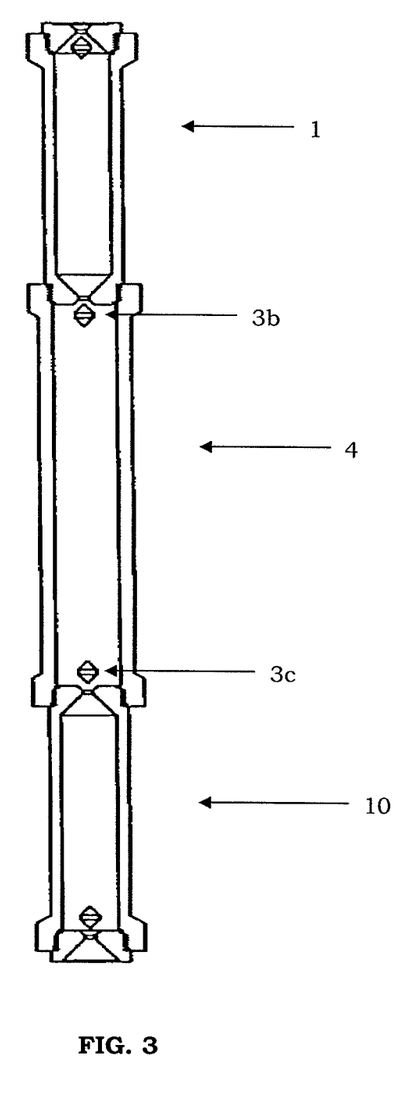
FIG. 3 is a schematic representation of one embodiment of the present invention in which the loading zone, vessel and unloading zone are contained in separate units.

FIG. 3 illustrates an embodiment of the present invention in which the loading zone 1, vessel 4, and unloading zone 10 are each contained in separate units. The loading zone 1 is in contact with the vessel 4 through a restriction device 3b, and the vessel 4 is in contact with the unloading zone 10 through a restriction device 3c. There is no limitation to the axial orientation of any of the zones in the present invention.

Figure 4:
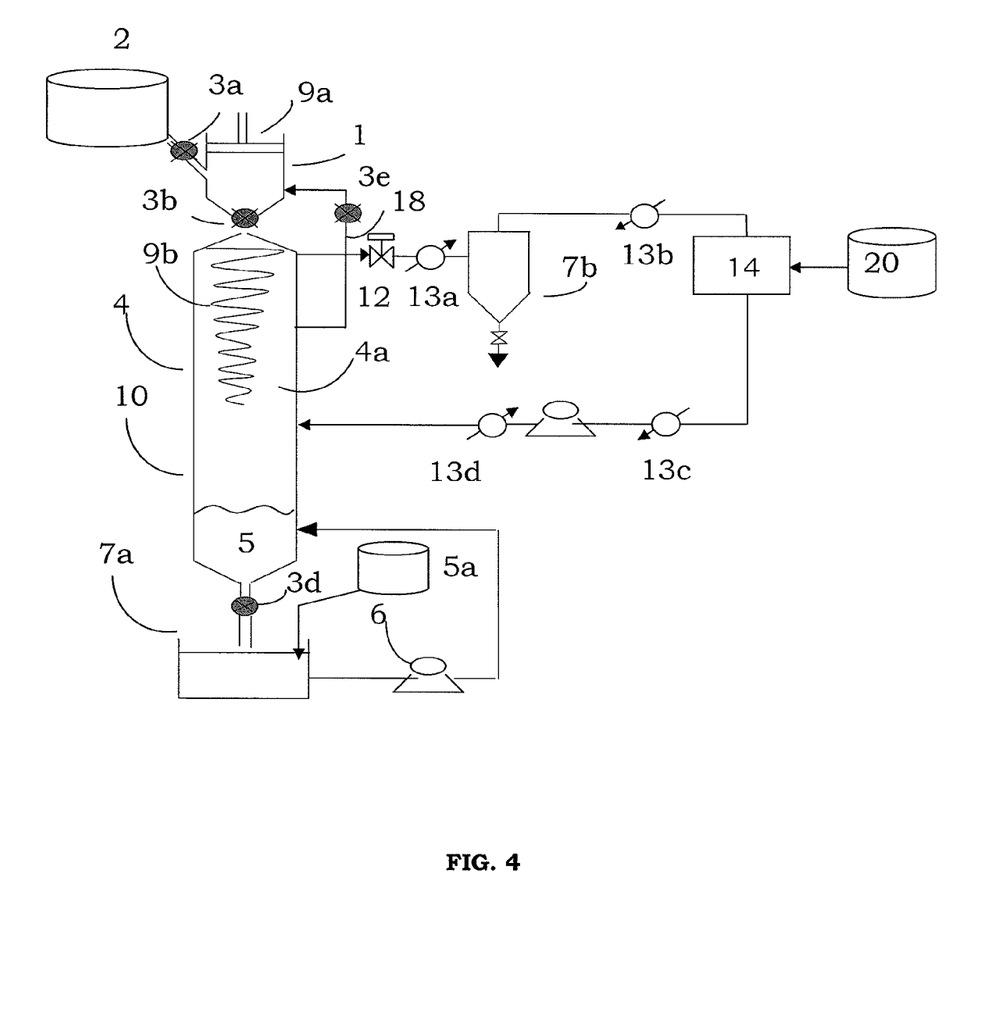
FIG. 4 is a schematic representation of another embodiment of the present invention for the continuous processing of solids using near-critical or supercritical fluids illustrating a system without a restriction device between the treatment zone and the unloading zone.

FIG. 4 illustrates another embodiment of the present invention for the continuous processing of solids using near-critical or supercritical fluids illustrates a system without a restriction device between the treatment zone and the unloading zone. The supercritical fluid plus the soluble compounds leaves the vessel 4 from the top through a pressure reduction valve 12. The solvent power decreases with pressure reduction, so the soluble compound(s) precipitate. To assure total precipitation, the supercritical solvent is heated by heat exchanger 13a above the saturation temperature to reach the gas phase. Under those conditions the solvent power is negligible. Then the material is collected in a separator 7b while the solvent in gas phase leaves the separator 7b from the top and is re-circulated through the solvent recycling system and back to the vessel 4. The solvent is entered the receiver 14 after is condensed by heat exchanger 13b. Then the solvent is sub-cooled by heat exchanger 13c and pumped by pump 15 to the extraction pressure and heated by heat exchanger 13d to the extraction temperature.

Figure 5:
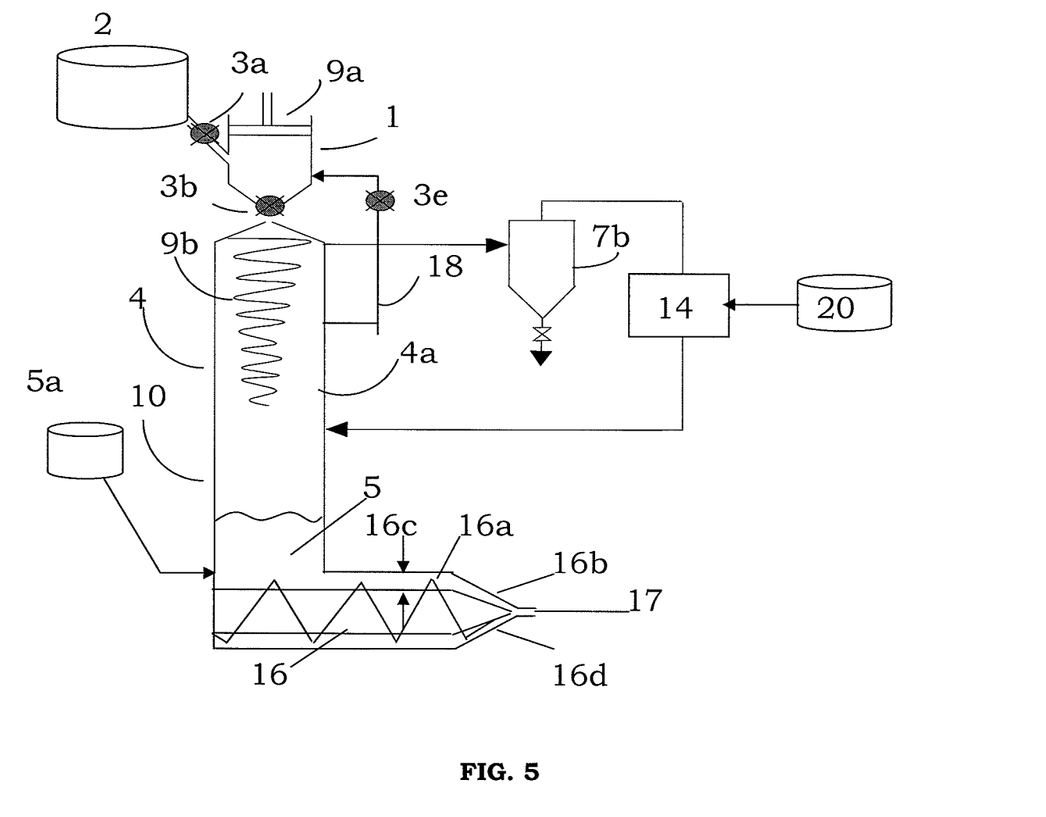
FIG. 5 is a schematic representation of another embodiment of the present invention for the continuous processing of solids using near-critical or supercritical fluids illustrating a system with a perpendicularly oriented separation section with a screw press with barrier fluid in the unloading zone.

Also illustrated in FIGS. 1, 4, and 5 is an additional source 5a of barrier fluid 5 to compensate the losses and maintained a certain level of liquid in the separating device 7a after the restriction means 3d.

Figure 6:
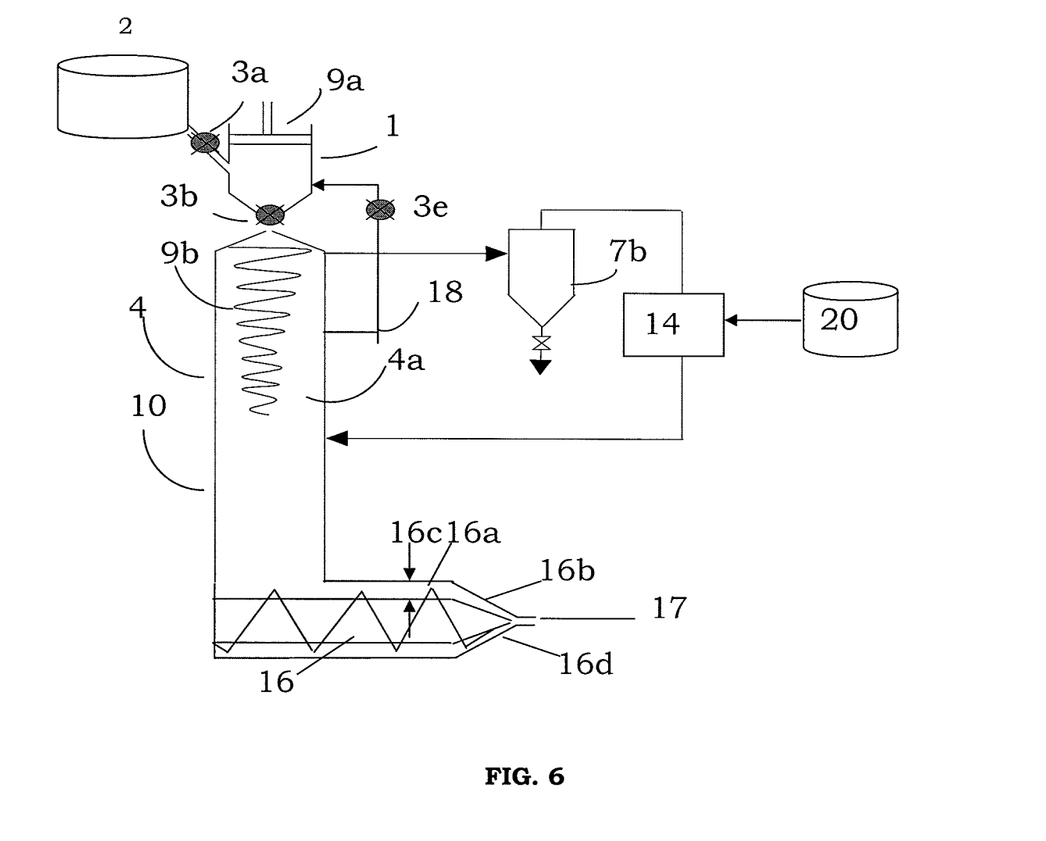
FIG. 6 is a schematic representation of another embodiment of the present invention for the continuous processing of solids using near-critical or supercritical fluids illustrating a system with a perpendicularly oriented separation section with a screw press and a barrier fluid in the unloading zone without barrier fluid in the unloading zone.

FIGS. 5 and 6 illustrate other embodiments of the present invention that extracted solid material is removed out of the pressure vessel 4 continuously by a horizontal screw press perpendicularly oriented to vessel 4. The screw press 16 is continuously rotating to transfer the raffinate out of the vessel 4. The shaft diameter 16a increases progressively towards the exit end 16b of the screw press 16. The annular space 16c between the cage 16d and the shaft 16 decreases and at the same time increases the compaction in the solids. The extracted solid material is pushed through the gas-sealing section 17. This gas-sealing section 17 keeps the pressure in the vessel 4 constant. FIG. 5 illustrates a system with barrier fluid 5, whereas FIG. 6 illustrates a system without barrier fluid 5.

The mechanical conveying device 9b can extend through the entire length of vessel 4 to restriction means 3d and extend through the barrier fluid 5 when restriction device 3c is not required.

Figure 8:
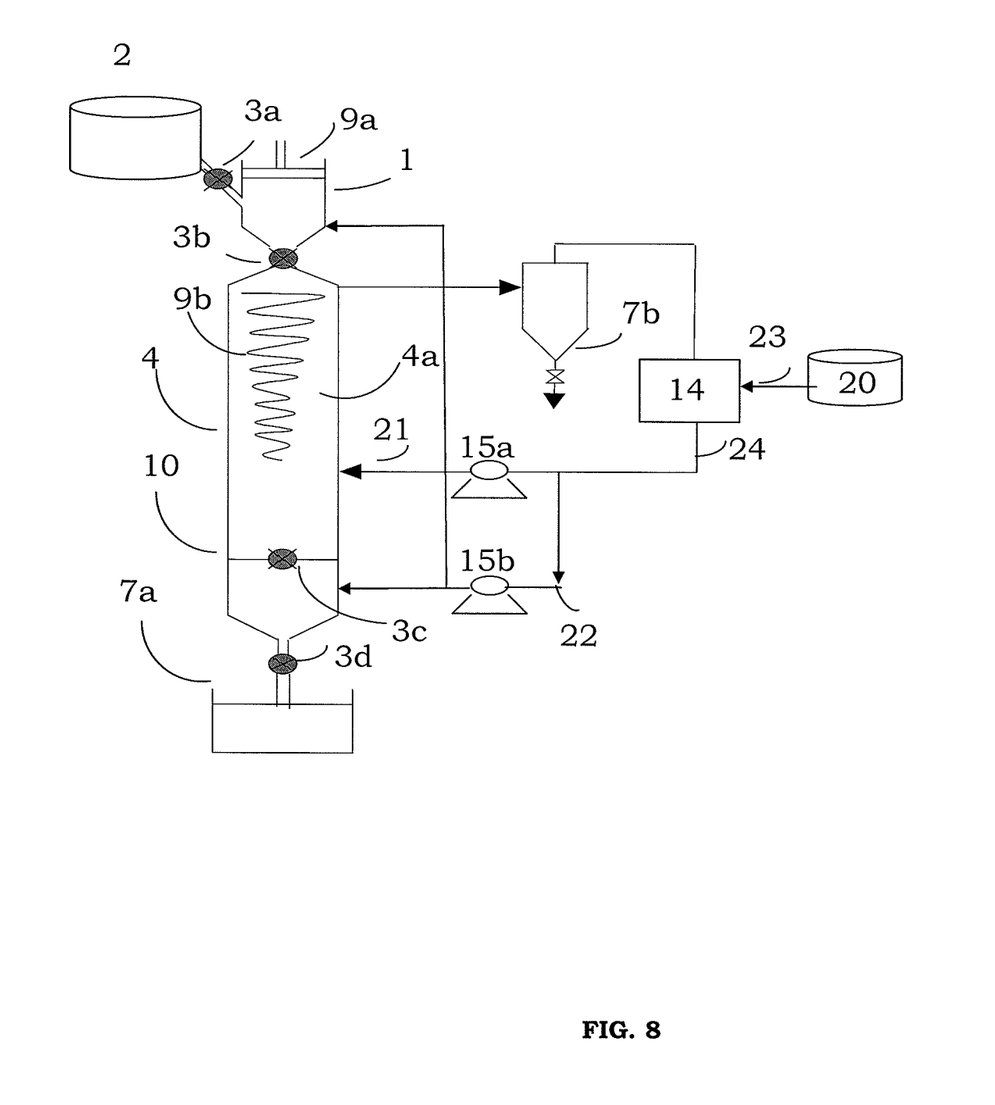
FIG. 8 is a schematic representation of another embodiment of the present invention for continuous processing and solids handling using a single external fluid source as equalization pressure for the loading and unloading zones as well as a replenishment of near-critical/super critical fluid in the treatment zone.

FIG. 8 is a schematic representation of another embodiment of the present invention for continuous processing and solids handling using a single external fluid source 20 (such as $CO_2$) in fluid communication with receiver 14 to be used as equalization pressure for the loading and unloading zones as well as a replenishment of near-critical/super critical fluid in the treatment zone. The external fluid source 20 is capable of pressurizing loading zone 1 and unloading zone 10 to a pressure substantially equal to a pressure of treatment zone 4a prior to opening the respective restriction devices 3b, 3c therebetween the zones (discussed in detail above) to flow material and/or fluid into the adjacent zone. The external fluid source is also capable of replenishing the near-critical/super-critical fluid in the treatment zone. The flow of the near-critical or supercritical fluid into the loading zone, the treatment zone, and the unloading zone can be individually controlled (not shown). Pumps 15a, 15b are variable to provide predetermined pressures to either or all zones: loading zone 1, treatment zone 4a, and unloading zone 10. Valves and pressure regulators (not shown) are in fluid circuits 21, 22, 23, 24 to control flow direction, volume, and flow rate. However, one of skill in the art can design the fluid circuit control system to regulate flow within the system to meet customer specifications.

Though FIG. 8 shows one external fluid source 20 pressurizing treatment zone 4a, loading zone 1, and unloading zone 10 with pumps 15a, 15b performing the pumping work or head to a given fluid circuit 21, 22, one skilled in the art will appreciate that the number of external fluid sources, fluid circuits, and pumps are dependent on system flow/pressurization needs and that any combination of external fluid sources, fluid circuits, pumps, valves, regulators, flow splitters, etc. are within the contemplation of the present invention. Some examples are, but not limited to: (i) one external fluid source 20 fluidly communicating with a fluid circuit 21 pressurized by one pump 15a connected to treatment zone 4a while the same near-critical/super critical fluid source 20 is in fluid communication with fluid circuit 22 connected to loading zone 1 and unloading zone 10 pressurized by pump 15b (FIG. 8), (ii) one external fluid source and one pump fluidly communicating with three fluid circuits, each fluid circuit individually connected to treatment zone 4a, loading zone 1, and unloading zone 10, (iii) three external fluid sources, each with a dedicated pump connected to an individual zone being the loading zone 1, treatment zone 4a, or unloading zone 10, and (iv) any combination of external fluid sources, pumps, and fluid circuits to meet customer specification.

In operation, one method for using the one embodiment of the present invention for the continuous processing of a starting material using a first near-critical or supercritical fluid comprises:

Loading a loading zone with the starting material;

Providing a vessel having a treatment zone for treatment of the starting material;

Circulating the first near-critical or supercritical fluid from the treatment zone to the loading zone to equalize the pressure between the loading zone and the treatment zone;

Introducing the starting material from the loading zone into the treatment zone under first near-critical or supercritical conditions through a restriction device;

Conveying the starting material through the vessel with the first near-critical or supercritical fluid to treat the starting material; and Collecting raffinate in an unloading zone.

A further operational step can include the step of collecting raffinate in the unloading zone comprises a second fluid in the unloading zone, wherein the second fluid being immiscible with the first near-critical or supercritical fluid.

Another further operational step can include the step of conveying being performed vertically.

Another further operational step can include the step of removing the raffinate from the unloading zone by a screw press.

Another further operational step can include the screw press being horizontally oriented having an entry end and an exit end, wherein the exit end comprising a converging section to seal gas.

Another further operational step can include the step of removing the raffinate and a portion of the second fluid from the unloading zone.

Another further operational step can include the step of removing the raffinate from the second fluid.

Another further operational step can include the step of recycling the second fluid back to the unloading zone.

Another further operational step can include the step of introducing further comprises actuating a piston.

Another further operational step can include the step of conveying is accomplished by moving a screw.

Another further operational step can include the step of introducing being accomplished by a restriction device being selected from the group consisting of a ball valve, a check valve, a gate valve, a rotary valve, and a plug valve.

Another further operational step can include the starting material being selected from the group consisting of a natural source material, vegetable seeds, herbs, botanicals, synthetic material, contaminated solids, pharmaceutical material and a combination thereof.

Another further operational step can include the first near-critical or supercritical fluid being selected from the group consisting of ethane, propane, carbon dioxide, nitrous oxide, butane, isobutene, sulfur hexafluoride, water, hydrochlorofluorocarbons, hydrofluorocarbons, alkanes, and a combination thereof.

Another further operational step can include the step of introducing the starting material into the vessel is continuous.

Another further operational step can include the step of collecting raffinate is continuously.

Another further operational step can include the step of removing the raffinate from the unloading zone is continuous.

Another further operational step can include the step of recycling the first near-critical or supercritical fluid through a separating device back to the vessel.

Another further operational step can include the step of treating being selected from the group consisting of extraction, reaction, coating, absorption, adsorption, and a combination thereof.

Another further operational step can include the step of treating the starting material within the vessel further includes the step of mechanically conveying the starting material within the vessel.

Another further operational step can include the second fluid level in the unloading zone is controlled.

Another further operational step can include substances in the starting material that are soluble in the first near-critical or supercritical fluid are fractionated by a fractionation technique.

Another further operational step can include the fractionation technique being selected from the group consisting of a temperature gradient device, a sequential depressurization device, an adsorption device, an absorption device, and a combination thereof.

Another further operational step can include the first near-critical or supercritical fluid and the substances in the starting material that are soluble in the first near-critical or supercritical fluid are transferred to another vessel to undergo a reaction.

Another further operational step can include more than one temperature zone is provided in the vessel.

Another further operational step can include the second fluid is selected from the group consisting of water, alcohols, ethers, ketones, ionic liquids, any other fluid that is immiscible with the first near critical or supercritical fluid, and a combination thereof.

Another further operational step can include a screw press removes the raffinate and the second fluid from the unloading zone.

Another further operational step can include the operational step being carried out in a single unit or more than one unit. Another further operational step can include the step of transferring the raffinate from the treatment zone to the unloading zone through a restriction device.

Another further operational step can include the step of circulating the first near-critical or supercritical fluid from the treatment zone to the unloading zone to equalize the pressure between the unloading zone and the treatment zone.

Another further operational step can include the step of conveying is accomplished by gravity.

In operation, another method for using the one embodiment of the present invention for the continuous processing of a starting material using a first near-critical or supercritical fluid comprises:

Loading a loading zone with the starting material;

Providing a vessel having a treatment zone for treatment of the starting material and having an unloading zone to unload a raffinate from the vessel;

Substantially equalizing the pressure between the loading zone and the treatment zone before introducing the starting material into the treatment zone;

Introducing the starting material from the loading zone into the treatment zone after substantially equalizing the pressure therebetween;

Conveying the starting material through the treatment zone with the first near-critical or supercritical fluid to treat the starting material to form a raffinate;

Substantially equalizing the pressure between the treatment zone and the unloading zone before collecting the raffinate in the unloading zone; and Collecting the raffinate in the unloading zone.

The above-mentioned method can further include operational steps previously disclosed for the first operational procedure and are not repeated again here, but are contemplated within the scope of the present invention in combination with the latter disclosed method.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

We claim:

1. A method for the continuous processing of a starting material using a first near-critical or supercritical fluid comprising:
   a. loading a loading zone with the starting material;
   b. providing a vessel having a treatment zone for treatment of the starting material;
   c. circulating the first near-critical or supercritical fluid from the treatment zone to the loading zone to equalize the pressure between the loading zone and the treatment zone;
   d. introducing the starting material from the loading zone into the treatment zone under first near-critical or supercritical conditions through a restriction device;
   e. conveying the starting material through the vessel with the first near-critical or supercritical fluid to treat the starting material;
   f. circulating the first near-critical or supercritical fluid from the treatment zone to an unloading zone to equalize the pressure between the unloading zone and the treatment zone;
   g. opening a restriction device in direct fluid communication between the treatment zone and the unloading zone;
   h. transferring raffinate from the treatment zone to the unloading zone through the restriction device in direct fluid communication between the treatment zone and the unloading zone; and
   i. collecting the raffinate in an unloading zone.

2. The method of claim 1, wherein the step of collecting raffinate in the unloading zone comprises a second fluid in the unloading zone, wherein the second fluid being immiscible with the first near-critical or supercritical fluid.

3. The method of claim 2, wherein the second fluid level in the unloading zone is controlled.

4. The method of claim 2, wherein the second fluid is selected from the group consisting of water, alcohols, ethers, ketones, ionic liquids, any other fluid that is immiscible with the first near critical or supercritical fluid, and a combination thereof.

5. The method of claim 2, wherein a screw press removes the raffinate and the second fluid from the unloading zone.

6. The method of claim 1, wherein the step of conveying is performed vertically.

7. The method of claim 6, further comprising the step of removing the raffinate and a portion of the second fluid from the unloading zone.

8. The method of claim 7, further comprising the step of removing the raffinate from the second fluid.

9. The method of claim 8, further comprising the step of recycling the second fluid back to the unloading zone.

10. The method of claim 1, further comprising the step of removing the raffinate from the unloading zone by a screw press.

11. The method of claim 10, wherein the screw press is horizontally oriented having an entry end and an exit end, wherein the exit end comprising a converging section to seal gas.

12. The method of claim 10, wherein the step of removing the raffinate from the unloading zone is continuous.

13. The method of claim 1, wherein the step of introducing further comprises actuating a piston.

14. The method of claim 1, wherein the step of conveying is accomplished by moving a screw.

15. The method of claim 1, wherein the step of introducing is accomplished by a restriction device is selected from the group consisting of a ball valve, a check valve, a gate valve, a rotary valve, and a plug valve.

16. The method of claim 1, wherein the starting material is selected from the group consisting of a natural source material, vegetable seeds, herbs, botanicals, synthetic material, contaminated solids, pharmaceutical material and a combination thereof.

17. The method of claim 1, wherein the first near-critical or supercritical fluid is selected from the group consisting of ethane, propane, carbon dioxide, nitrous oxide, butane, isobutene, sulfur hexafluoride, water, hydrochlorofluorocarbons, hydrofluorocarbons, alkanes, and a combination thereof.

18. The method of claim 1, wherein the step of introducing the starting material into the vessel is continuous.

19. The method of claim 1, wherein the step of collecting raffinate is continuously.

20. The method of claim 1, further comprising the step of recycling the first near-critical or supercritical fluid through a separating device back to the vessel.

21. The method of claim 1, wherein the step of treating is selected from the group consisting of extraction, reaction, coating, absorption, adsorption, and a combination thereof.

22. The method of claim 1, wherein the step of treating the starting material within the vessel further includes the step of mechanically conveying the starting material within the vessel.

23. The method of claim 1, wherein substances in the starting material that are soluble in the first near-critical or supercritical fluid are fractionated by a fractionation technique.

24. The method of claim 23, wherein the fractionation technique is selected from the group consisting of a temperature gradient device, a sequential depressurization device, a adsorption device, an absorption device, and a combination thereof.

25. The method of claim 1, wherein the first near-critical or supercritical fluid and the substances in the starting material that are soluble in the first near-critical or supercritical fluid are transferred to another vessel to undergo a reaction.

26. The method of claim 1, wherein more than one temperature zone is provided in the vessel.

27. The method of claim 1, wherein steps (a) through (f) are carried out in a single unit.

28. The method of claim 1, wherein steps (a) through (f) are carried out in more than one unit.

29. The method according to claim 1, wherein the step of conveying is accomplished by gravity.

30. An apparatus for the continuous processing of a starting material using a first near-critical or supercritical fluid comprising:
   a. a loading zone;
   b. a vessel having a treatment zone;
   c. a restriction device between the loading zone and the vessel through which the starting material enters the vessel from the loading zone;
   d. a mechanical conveying device for introducing the starting material from the loading zone into the treatment zone of the vessel for treating the starting material with the first near-critical or supercritical conditions;
   e. a fluid circuit between the treatment zone and the loading zone to flow the first near-critical or supercritical conditions having a higher pressure in the treatment zone than a pressure in the loading zone to equalize pressure between the loading zone and the vessel;
   f. an unloading zone for collecting raffinate; and
   g. a screw press section to remove the raffinate from the unloading zone, wherein the screw press section is perpendicularly oriented to the unloaded zone and includes an entry end and an exit end, wherein the exit end comprising a converging section defined by an inner diameter of an outer housing being reduced more than an outer diameter of a screw to seal gas as solids in the screw press section is compacted at the exit end.

31. The apparatus of claim 30, wherein the unloading zone contains a second fluid.

32. The apparatus of claim 30, further comprising a separation zone in fluid communication with the unloading zone to remove the raffinate from the vessel.

33. The apparatus of claim 31, further comprising a separation zone in fluid communication with the unloading zone to remove the raffinate and the second fluid from the vessel.

34. The apparatus of claim 33, further comprising a recirculation pump disposed in a fluid circuit between the separation zone and the unloading zone to recycle the second fluid back to the unloading zone.

35. The apparatus of claim 33, further comprising a hydrocyclone to separate the raffinate from the second fluid.

36. The apparatus of claim 30, wherein the mechanical conveying device is a piston.

37. The apparatus of claim 30, wherein the mechanical conveying device is a screw.

38. The apparatus of claim 30, wherein the restriction device is selected from the group consisting of a ball valve, a check valve, a gate valve, a rotary valve, and a plug valve.

39. The apparatus of claim 30, further comprising a mechanical conveying device within the vessel to convey the starting material therein.

40. The apparatus of claim 39, wherein the mechanical conveying device is selected from the group consisting of a pneumatic device, a hydraulic device, an electric device, a magnetic device, and a combination thereof.

41. The apparatus of claim 30, wherein substances in the starting material that are soluble in the first near-critical or supercritical fluid are collected using a cyclone separator.

42. The apparatus of claim 30, wherein substances in the starting material that are soluble in the first near-critical or supercritical fluid are separated from the first near-critical or supercritical fluid by using adsorption vessels.

43. The apparatus of claim 30, wherein substances in the starting material that are soluble in the first near-critical or supercritical fluid are separated from the first near-critical or supercritical fluid by using absorption columns.

44. The apparatus according to claim 30, further comprising a restriction device between the treatment zone and the unloading zone.

45. The apparatus according to claim 44, further comprising a fluid circuit between the treatment zone and the unloading zone to flow the first near-critical or supercritical fluid from the treatment zone having a higher pressure than a pressure of the unloading zone to equalize pressure between the unloading zone and the treatment zone.

\* \* \* \* \*